United States Patent
Roelke et al.

(10) Patent No.: US 9,592,829 B2
(45) Date of Patent: Mar. 14, 2017

(54) METHOD AND CONTROL UNIT FOR ROBUSTLY DETECTING A LANE CHANGE OF A VEHICLE

(75) Inventors: Volker Roelke, Leonberg (DE); Tobias Rentschler, Pforzheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 105 days.

(21) Appl. No.: 13/390,706

(22) PCT Filed: Aug. 6, 2010

(86) PCT No.: PCT/EP2010/061490
§ 371 (c)(1),
(2), (4) Date: May 1, 2012

(87) PCT Pub. No.: WO2011/020715
PCT Pub. Date: Feb. 24, 2011

(65) Prior Publication Data
US 2012/0206708 A1    Aug. 16, 2012

(30) Foreign Application Priority Data
Aug. 21, 2009   (DE) .................. 10 2009 028 774

(51) Int. Cl.
*G01C 3/08*     (2006.01)
*B60W 30/12*    (2006.01)
*B62D 15/02*    (2006.01)

(52) U.S. Cl.
CPC ........... *B60W 30/12* (2013.01); *B62D 15/025* (2013.01); *B62D 15/0255* (2013.01)

(58) Field of Classification Search
CPC .................................. G01C 3/08; G01C 21/26
(Continued)

(56) References Cited

U.S. PATENT DOCUMENTS 5,555,555 A * 9/1996 Sato ..................... G06K 9/4633
                                                                    382/104
5,892,855 A * 4/1999 Kakinami ............ G06K 9/4633
                                                                    348/119

(Continued)

FOREIGN PATENT DOCUMENTS

CN          101101333 A       1/2008
DE          19906614          10/1999
(Continued)

OTHER PUBLICATIONS

International Search Report, PCT International Application No. PCT/EP2010/061490, dated Feb. 3, 2011.

*Primary Examiner* — Luke Ratcliffe
*Assistant Examiner* — Vicente Rodriguez
(74) *Attorney, Agent, or Firm* — Norton Rose Fulbright US LLP (57) ABSTRACT

A method for detecting a lane change of a vehicle or for providing a curvature of a target line for lane guidance of a vehicle is described, the method including a step of receiving a first piece of traffic lane information which represents an optically detected first traffic lane boundary adjacent to or in front of a left-hand vehicle side and/or receiving a second piece of traffic lane information which represents an optically detected second lane boundary adjacent to or in front of a right-hand vehicle side. The method further includes a step of detecting a lane change if the first and/or the second piece(s) of traffic lane information represent(s) a traffic lane boundary which is less than a predetermined lateral distance to a vehicle side, or ascertaining a curvature of a desired target line for lane guidance of a vehicle from the first piece of traffic lane information weighted using a first weighting factor and the second piece of traffic lane information (Continued)

weighted using a second weighting factor, on the basis of a correlation observation.

6 Claims, 3 Drawing Sheets

(58) Field of Classification Search
USPC .......................................................... 356/4.01
See application file for complete search history.

(56)  References Cited

U.S. PATENT DOCUMENTS

| | | | |
|---|---|---|---|
| 6,489,887 B2 * | 12/2002 | Satoh et al. | 340/436 |
| 6,577,334 B1 | 6/2003 | Kawai et al. | |
| 7,711,464 B2 * | 5/2010 | Kaufmann | B62D 15/029 |
| | | | 701/41 |
| 7,890,231 B2 * | 2/2011 | Saito et al. | 701/41 |
| 2002/0095246 A1 | 7/2002 | Kawazoe | |
| 2004/0016870 A1 | 1/2004 | Pawlicki et al. | |
| 2005/0004731 A1 | 1/2005 | Bohm et al. | |
| 2007/0233343 A1 | 10/2007 | Saito et al. | |

FOREIGN PATENT DOCUMENTS

| | | |
|---|---|---|
| DE | 10137292 | 3/2003 |
| EP | 2012211 | 1/2009 |
| WO | WO 2006/037445 | 4/2006 |

* cited by examiner

METHOD AND CONTROL UNIT FOR ROBUSTLY DETECTING A LANE CHANGE OF A VEHICLE

BACKGROUND INFORMATION

Systems for lane departure warning (LDW) in which the driver of a motor vehicle is acoustically or haptically warned of departing from the traffic lane are now commercially available. In addition to these LDW systems, steering assistance systems (LKS systems=Lane Keeping Support Systems), which actively support the driver with the aid of directed guiding torques in keeping the vehicle in the traffic lane, have also recently been in production (see, for example, German Patent No. DE 101 37 292). These systems enable the driver to perform a comfortable lane change with the aid of various distinct lane change functionalities. Some conventional systems offer the driver a guided lane change. However, in this case mostly two traffic lane boundary lines are needed for evaluating the crossing or departing from a traffic lane, which makes the evaluation complex and time-intensive.

These LKS systems also need a target line for lane guidance on which they may guide the vehicle. Until now, simple methods, which process parallel individual lines, have been used for generating this target line. However, methods which are based directly on measuring points and use additional sensors (for example digital maps, radar) may also generate such a target line.

This target line may be filtered using standard filters (low-pass filters, Kalman filters, etc.) to smooth their dynamics. However, such filtering is time-consuming and therefore disadvantageous in real-time systems.

SUMMARY

Against this background, example methods, control units using these methods and, finally, appropriate computer program products are provided in accordance with the present invention. Advantageous embodiments are derived from the description below.

The present invention provides a method for recognizing a lane change of a vehicle or for providing a target line for a lane guidance of a vehicle during the travel of the vehicle, the method having the following steps:
  receiving a first piece of traffic lane information which represents an optically detected first traffic lane boundary, in particular of an individual line, next to or in front of a left-hand vehicle side and/or receiving a second piece of traffic lane information which represents an optically detected second traffic lane boundary, in particular of an individual line, next to or in front of a right-hand vehicle side; and
  detecting a traffic lane change if the first and/or the second piece(s) of traffic lane information represent(s) a traffic lane boundary which is less than a predetermined lateral distance to a vehicle side, or
  ascertaining a curvature of a desired target line for a lane guidance of a vehicle from the first piece of traffic lane information weighted using a first weighting factor and the second piece of traffic lane information weighted using a second weighting factor.

The present invention furthermore provides a control unit, which is designed to carry out or implement the steps of the method according to the present invention. Using this embodiment variant of the present invention in the form of a control unit, the object of the present invention may also be achieved in a fast and efficient manner.

A control unit may be understood as an electrical or electronic device which processes sensor signals and outputs control signals as a function thereof. The control unit may have an interface, which may be implemented as hardware and/or software. In a hardware embodiment, the interfaces may be, for example, part of a so-called system ASIC which contains different functions of the control unit. It is, however, also possible that the interfaces are independent, integrated circuits or are at least partially made of discrete components. In a software embodiment, the interfaces may be software modules which are present, for example, on a microcontroller along with other software modules.

A computer program product having a program code, which is stored on a machine-readable medium, such as a semiconductor memory, a hard disk memory, or an optical memory, is also advantageous and is used for carrying out the example methods when the program is executed on a control unit.

In accordance with the present invention, a traffic lane change of the vehicle may now be recognized using only one line in the form of a traffic lane boundary. A traffic lane change may already be understood as crossing a traffic lane boundary. Here, a lateral distance of the traffic lane boundary to one of the two vehicle sides is evaluated and it is checked whether this lateral distance is less than a predetermined minimum measure. In this case, the lateral distance between the traffic lane boundary and the vehicle side is generated in a control unit from the received first and/or second piece of traffic lane information. Here, information may be taken into account via an installation or the viewing angle of an optical sensor (for example, a video camera) in the vehicle in providing the traffic lane information. Furthermore, another aspect of the present invention is based on the recognition that a significant smoothing of a target line for lane guidance of the vehicle may be achieved when the curvature of the desired target line is ascertained from the first piece of traffic lane information weighted using a first weighting factor and from the second piece of traffic lane information weighted using a second weighting factor. By weighting using the first and the second weighting factors of the individual pieces of traffic lane information, which represent a curvature of the corresponding traffic lane boundary, for example, a later filtering of the target line may be avoided. At the same time, only optically detected information about a traffic lane boundary, such as a roadway marking, a transition between a roadway and a grass verge, or the like is, in turn, used. By avoiding later filtering of the ascertained target line, the desired target line may be provided significantly faster and technically more easily. The second step may be considered as a two-part step, so that the first step and the first part of the second step are to be considered according to a first specific embodiment of the present invention, and the first step and the second part of the second step are to be considered the second specific embodiment of the present invention. Also, both variants of the second step may be contained in one specific embodiment, which allows an additional advantage in supporting the driver.

The present invention offers the advantage that a traffic lane change may now be recognized solely on the basis of (an) optically detected traffic lane boundary(ies), so that little numerical or circuit complexity is required for this recognition. At the same time, the information about the optically detected traffic lane boundary (which is usually already available for other driver assistance systems) may be utilized for providing a smooth target line for lane guidance of the vehicle. In order to thus provide the smooth target line, no further information, for example, from a digital map or via other surrounding objects is then needed. The approach presented here thus makes effective use of a few pieces of easily detected information possible and is thus superior to the conventional approaches.

According to one specific embodiment of the present invention, in the step of detecting, a lane change may be recognized when a vehicle side is no longer in a lateral corridor with respect to a traffic lane boundary, which is represented by the first and/or the second piece(s) of traffic lane information. A specific embodiment of this type of the present invention offers the advantage that even in the event of uneven driving (for example of a vehicle weaving left and right in a traffic lane), a lane change may be unambiguously recognized. For example, if the driver comes very close to a left-hand traffic lane marking and briefly crosses it, he will not immediately leave the lateral corridor with his vehicle. If the driver notices his negligence and returns to his original traffic lane, this may be recognized, despite the brief crossing of the traffic lane marking, as "not a lane change," so that an automatic traffic lane change support function does not need to be activated.

In the step of detecting, a traffic lane change may also be recognized if, during continuous evaluation of the lateral distance between the traffic lane boundary represented by the first and/or the second piece(s) of traffic lane information and a vehicle side, a sudden change in the lateral distance of the traffic lane boundary to the vehicle side is recognized. A specific embodiment of this type of the present invention offers the advantage that other pieces of line information reaching the field of vision of the sensor may be evaluated. For example, if the driver crosses a traffic lane boundary on a highway between the left-hand and the central traffic lanes with his/her vehicle, the sensor will recognize the roadside marking on what is now the far left side of the roadway after this traffic lane boundary has been crossed. This results in the distance between the far left roadside marking and the vehicle side now being considered as the lateral distance. Due to this sudden change in the lateral distance within the roadway markings to be evaluated, a lane change may thus also be recognized.

Furthermore, it is also advantageous if in the step of detecting the lane change is recognized if the recognized sudden change in the lateral distance of the traffic lane marking to the vehicle side takes place within a predetermined time period or a predetermined distance traveled, after the traffic lane boundary represented by the first and/or the second piece(s) of traffic lane information has dropped below the predetermined distance or after a vehicle side is no longer in the lateral corridor with respect to the traffic lane boundary. A specific embodiment of this type of the present invention offers the advantage of a very reliable recognition of a lane change with the aid of the above-mentioned time sequence between the recognized sudden change and the distance dropping below the predetermined distance or the departure from the lateral corridor with respect to the traffic lane boundary.

In another specific embodiment of the present invention, the lane change may be recognized in the step of detecting if an absolute value of a lateral distance between the vehicle side and the traffic lane boundary represented by the first and/or the second piece(s) of traffic lane information exceeds a predetermined distance threshold value. A specific embodiment of this type of the present invention offers the advantage that a very robust recognition of a lane change may be achieved. In particular when an absolute value of the lateral distance between the vehicle side and a traffic lane boundary is greater than a predetermined distance threshold value, a sudden change in the traffic lane markings in question and thus a traffic lane change may be inferred.

In another specific embodiment of the present invention, the lane change may also be recognized in the step of detecting after a predetermined distance threshold value has been exceeded if an absolute value of the lateral distance between the vehicle side and the traffic lane boundary represented by the first and/or the second piece(s) of traffic lane information is in a corridor range which includes distance values that are less than the predetermined distance threshold value. A specific embodiment of this type of the present invention offers the advantage of ensuring the recognition of a traffic lane change of the vehicle that has actually taken place and thus of avoiding an abrupt discontinuation of the traffic lane change support. In particular when the vehicle is in the new traffic lane, an absolute value of the lateral distance between the vehicle side and the (new) traffic lane boundary should be in the corridor range.

Furthermore, in the step of receiving, a third piece of traffic lane information, which represents an optically detected third traffic lane boundary to the left of the first traffic lane boundary and/or a fourth piece of traffic lane information which represents an optically detected fourth traffic lane boundary to the right of the second traffic lane boundary may also be received. In the step of detecting, the first and/or the second piece(s) of traffic lane information may be associated with a higher reliability value than the third and/or the fourth piece(s) of traffic lane information. The lane change may be detected when a sum of the reliability values of the pieces of traffic lane information taken into account in the detection is greater than a predefined reliability threshold value. A specific embodiment of this type of the present invention offers the advantage that a robust recognition of a lane change may take place by evaluating multiple traffic lane boundary lines. In particular, traffic lane boundary markings having a greater distance to the vehicle than the traffic lane boundary marking directly adjacent to the vehicle may also be taken into account. The lane change may thus be recognized as an actual lane change only when a certain number of traffic lane boundaries weighted using reliability values have been detected.

In another specific embodiment of the present invention, in the step of detecting or the step of ascertaining, the curvature of the target line may be ascertained on the basis of an addition of a first curvature weighted using the first weighting factor and a second curvature weighted using the second weighting factor, the first curvature being derivable from the first piece of traffic lane information and the second curvature being derivable from the second piece of traffic lane information. A specific embodiment of this type of the present invention offers the advantage that a link to be easily performed numerically or via the circuitry between the curvature of the first traffic lane boundary and the curvature of the second traffic lane boundary is made possible. A smooth target line for lane guidance of the vehicle may thus be rapidly and efficiently provided.

It may also be advantageous if, in the step of detecting or ascertaining for the first and the second weighting factors an identical value is used if a correlation value between the curvature from the first piece of traffic lane information and the curvature from the second piece of traffic lane information exceeds a predefined correlation threshold value. In particular, when both traffic lane boundaries in question have a high correlation value in relation to their curvatures (i.e., have an approximately identical or similar curvature characteristic), a very smooth target line may already be generated from the curvatures of the two traffic lane boundaries in question. For this reason, an identical weighting, for example using a weighting factor 0.5 of both of these traffic lane boundaries in question, in particular their curvature characteristics, may be performed.

According to another specific embodiment of the present invention, when a correlation value between the curvature from the first piece of traffic lane information and the curvature from the second piece of traffic lane information drops below a predefined correlation threshold value, in the step of detecting or ascertaining for each of the two pieces of traffic lane information an averaged curvature derivative value may be formed from the curvature derivative values over multiple time intervals prior to the point of time of ascertaining. When ascertaining the curvature of a desired target line, different values may be used for the first and the second weighting factors, the greater value being assigned to the one of the first and the second weighting factors for which the associated traffic lane information has the lower averaged curvature derivative value. A specific embodiment of this type of the present invention offers the advantage that the curvatures of the first and the second traffic lane boundaries are differently weighted only when the correlation value between the curvatures of the first and the second traffic lane boundaries remains below a predefined limit. In this case, the traffic lane boundary having the lower averaged curvature derivative values at the previous observation points in time has a substantially higher weight in ascertaining the curvature of the desired target line.

In another specific embodiment of the present invention, if a correlation value between the curvature from the first piece of traffic lane information and the curvature from the second piece of traffic lane information is within a predefined correlation threshold value range, in the step of detecting or ascertaining different values are used for the first and the second weighting factors, an averaged curvature derivative value being formed for each of the two pieces of traffic lane information from the curvature derivative values over multiple time intervals prior to the point in time of ascertaining and the one of the first and the second weighting factors receives the value $$W_1 = W_0 + |R| \cdot \frac{(0.5 - W_0)}{R_{max}},$$

at which the associated traffic lane information has the lower averaged curvature derivative value, and the other one of the first and the second weighting factors receives the value $$W_{N1} = 1 - W_1$$

where R represents the correlation coefficient, $W_0$ represents a weighting value for a correlation coefficient equal to zero and $R_{max}$ represents an upper limit of the correlation coefficient. A specific embodiment of this type of the present invention offers the advantage that, in a specified value range of the correlation value, the first and the second weighting factors may be determined very easily via a linear formula. This would make a rapid and efficient calculation possible for providing the smooth target line for lane guidance of the vehicle.

In order to avoid major sudden changes in the target line for lane guidance, in the step of detecting or ascertaining a change in the first and/or the second weighting factor(s) with respect to previous time intervals may be furthermore determined in different time intervals, the first and/or the second weighting factor(s) being changed at most by a predetermined percentage or at most by a predetermined absolute value.

In another specific embodiment of the present invention, in the step of receiving, a third piece of traffic lane information which represents an optically detected third traffic lane boundary to the left of the first traffic lane boundary and/or a fourth piece of traffic lane information which represents an optically detected fourth traffic lane boundary to the right of the second traffic lane boundary may also be received. Furthermore, in the step of detecting or ascertaining, the curvature of the desired target line for a lane guidance of the vehicle may also be ascertained from a third piece of traffic lane information weighted using a third weighting factor and/or from a fourth piece of traffic lane information weighted using a fourth weighting factor. A specific embodiment of this type of the present invention offers the advantage that, by taking into account the adjacent lines to the left of the first traffic lane boundary and/or to the right of the second traffic lane boundary, a more reliable and therefore smoother target line for lane guidance of the vehicle may be determined.

The present invention is explained in greater detail below as an example on the basis of the figures.

DETAILED DESCRIPTION OF EXAMPLE EMBODIMENTS

Identical or similar elements may be provided with identical or similar reference numerals in the figures, a repeat description of these elements being dispensed with. Furthermore, the figures and their description contain a combination of a plurality of features. Those skilled in the art will be aware of the fact that these features may be regarded individually or may be combined to form other combinations not explicitly described herein. Furthermore, the present invention is explained in the description that follows using different measures and dimensions, the present invention not being understood to be limited to these measures and dimensions. Furthermore, method steps according to the present invention may be carried out repeatedly or in a sequence different from the described sequence. If an exemplary embodiment includes an "and/or" link between a first feature and a second feature, this may be read in such a way that the exemplary embodiment according to one specific embodiment has both the first feature and the second feature and, according to another specific embodiment, it has either the first feature or the second feature.

Figure 1:
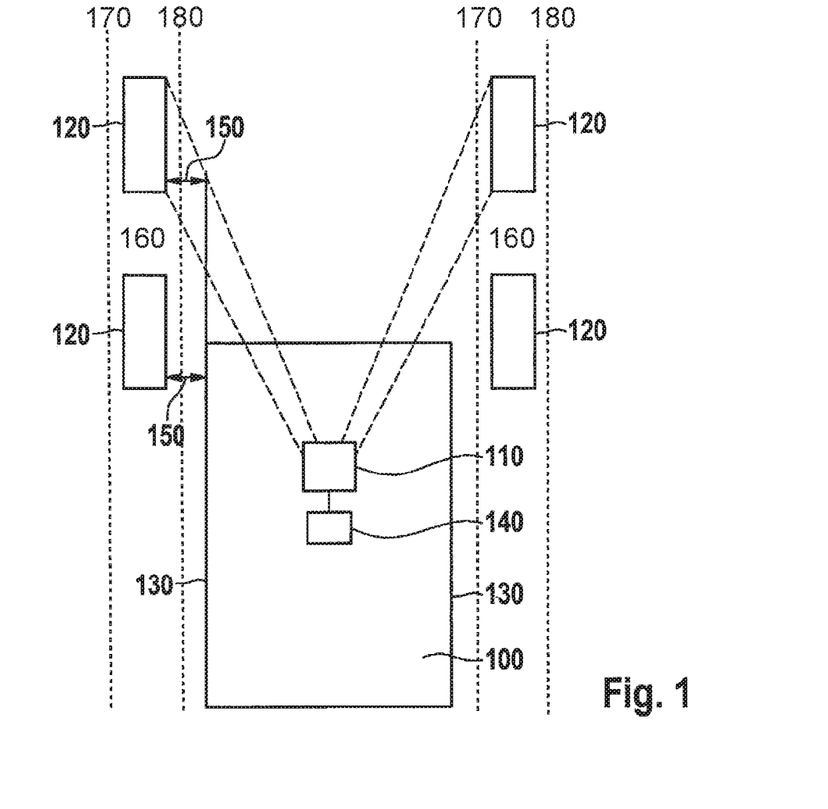
FIG. 1 shows a block diagram of an example system of elements for detecting traffic lane boundaries to carry out the present invention according to a first exemplary embodiment.

FIG. 1 shows a block diagram of a system of elements for detecting traffic lane boundaries for carrying out the present invention according to a first exemplary embodiment. According to the exemplary embodiment illustrated in FIG. 1, a vehicle 100 includes an optical sensor unit 110 (such as a video camera), which records traffic lane information about traffic lane boundaries, for example roadway markings 120. These roadway markings 120 are located to the right and left in front of or next to a vehicle side 130 of vehicle 100. Traffic lane boundaries 120 may be roadside markings or may be formed by a transition between a roadway surface and a shoulder of sand or grass. The only important thing is that a linear transition (edge) is recognized as traffic lane boundary 120, which may be evaluated in a digital image processing system using edge recognition. The appropriate traffic lane information is then generated from the recognized traffic lane boundary 120; an angle at which traffic lane boundary 120 is detected in optical sensor 110 may be taken into account, for example. Additional traffic lane information is generated from the recognized traffic lane boundary 120 including a traffic lane corridor 160 for each of a left-hand side traffic lane boundary and a right-hand side of the traffic lane boundary. Each traffic lane corridor 160 has a left-hand side that is marked by a virtual first line 170 and a right-hand side that is marked by a virtual second line 180. The traffic lane information formed from the traffic lane marking thus detected may then be transferred to an analyzing unit 140, in which, for example, a curvature of the corresponding traffic lane marking 120 or a lateral distance 150 between a vehicle side 130 and traffic lane marking 120 is ascertained from the received traffic lane information. In this case, a lateral distance 150 may be determined not only for a traffic lane marking 120 located directly next to vehicle 100, but rather an anticipated lateral distance 150 to a traffic lane marking 120, which may occur as vehicle 100 continues its travel toward a traffic lane boundary 120 located ahead in the direction of travel, may be determined (for example, by interpolation or extrapolation). The traffic lane information from one or multiple traffic lane boundaries 120 may then be used in analyzing unit 140 according to the approach for detecting a traffic lane change described in detail below. A detected "traffic lane change" may then be used further, for example, in a driver assistance system, for supporting the driver in performing the lane change.

In another exemplary embodiment of the present invention, a curvature characteristic of two separate traffic lane boundaries 120 may also be determined in analyzing unit 140 from the first and the second pieces of traffic lane information detected in optical detection unit 110 according to the approach also described in detail below. Using the curvature characteristics of these two traffic lane boundaries 120, a very smooth target line for lane guidance of vehicle 100 may then be determined. A smooth target line is to be understood as a (virtual) line on which the vehicle is to be kept by a technical lane guidance assistant. In order to offer the greatest possible comfort to the vehicle occupants, this line should possibly have no or only slight waving motions or sudden changes. The approach described in greater detail below offers the option of avoiding a subsequent filtering of a specified target line for smoothing this target line, so that rapid and effective calculation of this smooth target line becomes possible.

Figure 2:
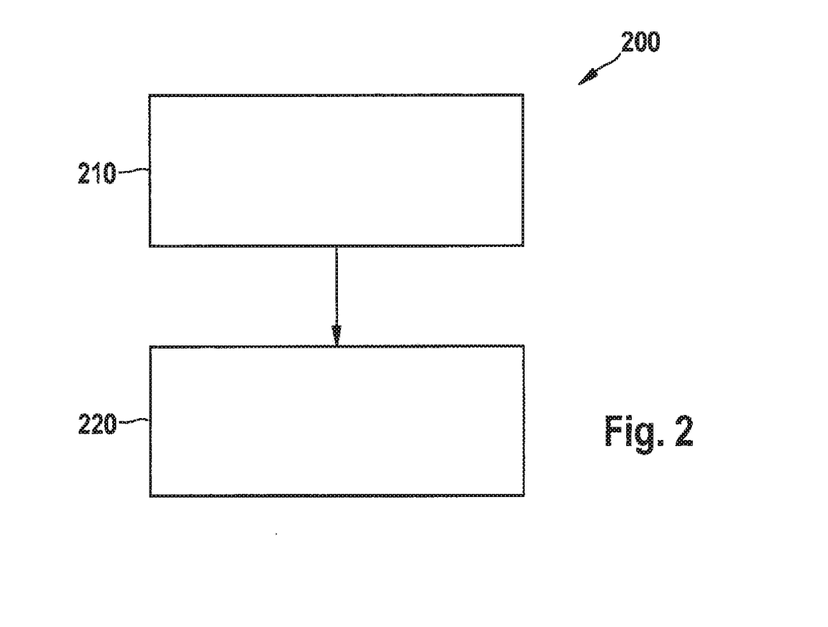
FIG. 2 shows a flow chart of an exemplary embodiment of the present invention as a method.

FIG. 2 shows a flow chart of one exemplary embodiment of the present invention as method 200 for recognizing a lane change of a vehicle or for providing a target line for lane guidance of a vehicle during the vehicle's travel. The method includes a step of receiving 210 a first piece of traffic lane information, which represents an optically detected first traffic lane boundary next to or in front of a left-hand vehicle side and/or the reception of a second piece of traffic lane information which represents an optically detected second traffic lane boundary next to or in front of a right-hand vehicle side. Furthermore, method 200 includes an additional step of detecting 220 a traffic lane change if the first and/or second piece of traffic lane information represents a traffic lane boundary which is less than a predetermined lateral distance to a vehicle side or ascertaining a curvature of a desired target line for a lane guidance of a vehicle from a first piece of traffic lane information weighted using a first weighting factor and from a second piece of traffic lane information weighted using a second weighting factor.

A first aspect of the approach presented in greater detail below may be used for an improved lane change support functionality of a lane keeping support (LKS) system. According to this aspect of the present invention, an example method is proposed for recognizing whether the vehicle has crossed a traffic lane boundary of the instantaneously used traffic lane. The example method is no longer based, in contrast to the conventional approaches, on the need for the existence or the evaluation of two lines which describe a traffic lane of the vehicle in question. The traffic lane of the vehicle in question will also sometimes be referred to as EGO traffic lane in the following description. In order to implement the approach proposed herein, no information, in particular, about another object in the surroundings (for example, recorded by video/radar/lidar sensors) and also no navigation data (for example, from a digital map showing traffic lanes) are needed. The approach proposed herein therefore exclusively uses line information detected by an optical sensor (for example, a video sensor).

One important aspect of the approach proposed herein may be seen in that the individual pieces of line information are taken into account and combined according to the present method, resulting in a robust recognition of crossing the host vehicle's traffic lane boundary. The method proposed below may be used in LKS systems having almost any degree of automation. The advantages of the approach presented in detail may be seen in that a reduction in the LKS deactivation rate in the case of a lane change becomes possible; this makes the LKS system more robust (which increases the acceptance by the system user) and results in a higher system availability for the driver. In addition, the method is indispensable when the lane change is automated (for example, when the LKS system performs an automatic lane change). In this case, the above-described method generates, in at least one embodiment variant, the condition for a robust implementability of this automated driving maneuver.

Methods for lane guidance are embedded in an LKS system, which may have different degrees of automation. In methods used in LKS systems, a target line for the roadway is usually calculated based on the left-hand and right-hand traffic lane boundaries (partly also using maps and object information in a data fusion). When the traffic lane boundary is crossed, a change of sign and a significant change in the absolute value of the transverse axis with respect to the centerline result. If the left-hand or right-hand line is now "lost" (for example, it is no longer visible to the optical sensor), no centerline may be formed. In that case, crossing of the traffic lane boundary cannot be recognized, and the LKS system is de-activated. If a guided lane change function is being used, the maneuver is discontinued, which may result in dangerous situations, for example in the case of partially completed maneuvers.

The following description relates to a detailed exemplary embodiment of the present invention as a method. This method is no longer based on determining such a centerline, but uses the existence and evaluation of individual lines. The method according to the exemplary embodiment presented herein derives therefrom the information of "crossing the traffic lane boundary." The procedure for this approach now includes deriving the information from reliable, or at least reliably recognized, lines that are laterally close to the vehicle. If this is impossible, other lines that have been found, for example of the adjacent lanes, may be taken into account.

A distinction is made between the situations "crossing the left-hand traffic lane boundary" and "crossing the right-hand traffic lane boundary." The method is also highly robust due to the use of lateral corridors around the recognized lines, which may be virtually placed around these recognized lines in an analyzing unit.

In carrying out the method, each available line (which may be the lines of the host vehicle's traffic lane, the lines of the adjacent traffic lanes, asphalt-grass transitions, or curbs) may be checked, for example, for "crossing" and/or "jumping."

The crossing of the lines is checked, for example, with the aid of the lateral vehicle axis to the line (i.e., a recognized lateral distance $Y_{lat}$ between the line and the vehicle side). For example, it is checked whether the vehicle is in a lateral corridor $Y_{corridor}$, for example ±0.1 m around the line, so that the following inequality is checked for the evaluation:

$$|Y_{lat}| \leq Y_{corridor}$$

If the vehicle attains this criterion, the system waits for some time until a large lateral value is attained. The large lateral value arises when the EGO traffic lane boundary lines are shifted. In this shift, a lane change is recognized and the particular traffic lane boundary lines are adjusted to the lane change. For example, when this traffic lane boundary is crossed, the left-hand traffic lane boundary lines become the right-hand traffic lane boundary lines, resulting in a jump in readjusting the traffic lanes. The robustness of the check results from using the corridor (rather than of an individual absolute value), and from the time, in which the lateral axis of the line must increase (not in a cycle).

A line may also "jump," i.e., it is not crossed by the vehicle, but is repositioned with respect to the vehicle by selecting the EGO traffic lane boundary. The robustness of the detection is achieved by checking whether the lateral vehicle axis $Y_{lat}$ exceeds a first limit $Y_{limit}$, i.e., whether the following relationship applies:

$$|Y_{lat}| > Y_{limit}$$

If this is the case, the system waits some time again until the lateral axis has jumped into a defined corridor $Y_{corridor}$ which is at a great distance from the first limit.

$$|Y_{lat}| \leq Y_{corridor}$$

The corridor and the limits should be established depending on what line is evaluated (for example, left-hand EGO traffic line boundary, left-hand adjacent lane boundary, etc.).

After checking, for example, all lines for whether they have jumped or have been crossed, the evaluation according to the present method continues in a control unit in which the recognized lane change may be used for a driver assistance function.

For the above-described procedure, two additional decisions are furthermore possible, namely a reliability decision and a hierarchical decision. In the reliability decision, a reliability (i.e., a reliability value) is assigned to each line. For example, the EGO lines are assigned a very high reliability value. Lines which are associated with the adjacent lane are assigned lower reliability values. The reliabilities (i.e., reliability values) may be statically specified in the system design or ascertained as a function of a plausibility measure (for example, how well the particular line is recognized), which each line has. In particular, those lines which are classified as "jumped" or "crossed" are considered. The reliabilities of the lines in question are added to form a cumulative value. If the cumulative value exceeds a reliability threshold, the event "traffic lane boundary crossed" is generated for the LKS lane change function.

Figure 3:
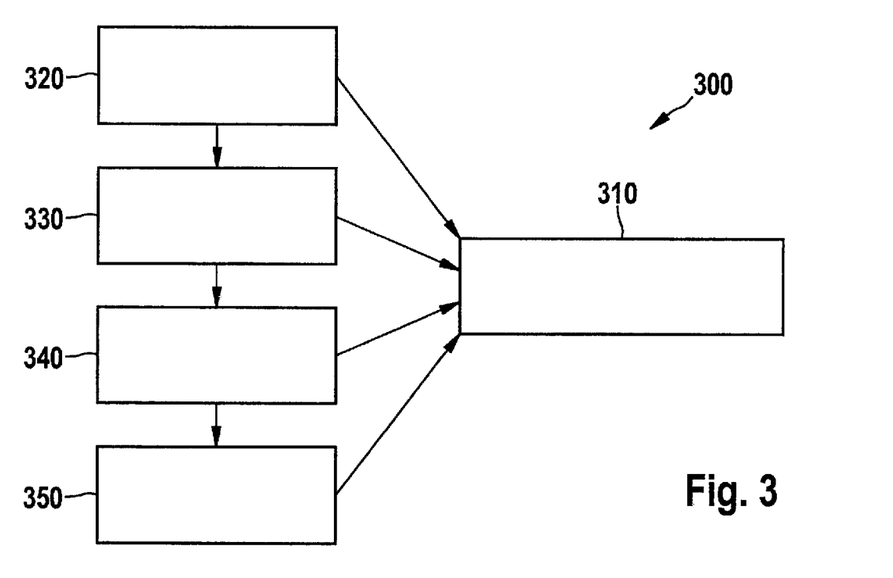
FIG. 3 shows a flow chart of another exemplary embodiment of the present invention as a method.

In the case of the hierarchical decision, the result or the status "left-hand traffic lane boundary crossed" is set or generated as illustrated, for example, by status 310 in method 300 according to the flow chart of FIG. 3. For this purpose, a check is initially performed in a step 320 of whether the left-hand EGO line (i.e., the left-hand EGO traffic lane boundary) has been crossed. If this is recognized to be the case, status 310 is set. If this was recognized not to be the case, a check is performed in a next step 330 of whether the right-hand EGO line (i.e., the right-hand EGO lane boundary) has jumped. If it is recognized in this next step 320 that the right-hand EGO line has jumped, status 310 is set again. If it is recognized in step 330 that the right-hand EGO line has not jumped, a next step 340 is executed, in which a check is performed of whether the line of the left-hand adjacent lane has jumped. If this is recognized to be the case, status 310 is set. If it is recognized in this step 340 that the left-hand line of the left-hand adjacent lane has not jumped, another check is initiated in a step 350, of whether the right-hand line of the right-hand adjacent lane has jumped. If this is recognized to be the case in the check according to step 350, status 310 may be set again.

Figure 4:
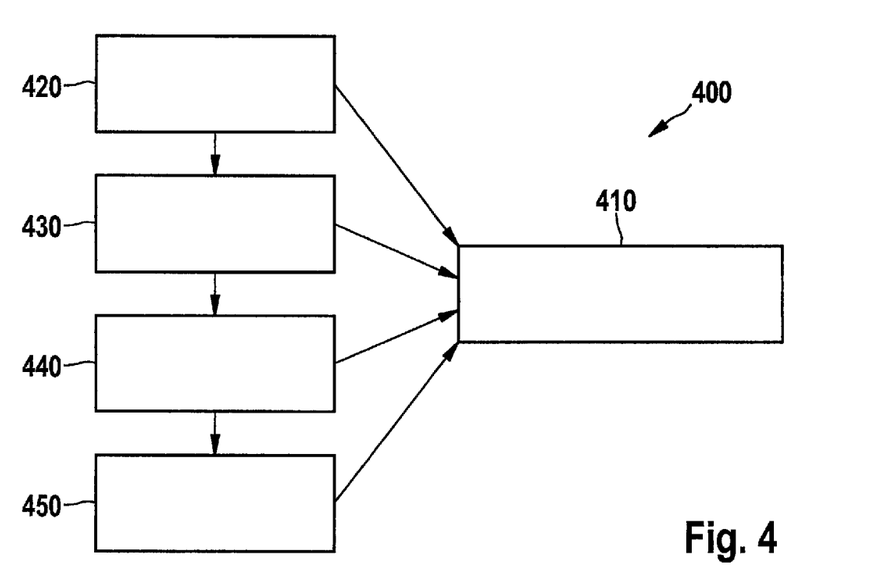
FIG. 4 shows a flow chart of another exemplary embodiment of the present invention as a method.

Furthermore, a check may also be performed in another method 400 of whether the right-hand traffic lane boundary has been crossed. If this check yields a positive result, a result or a status "right-hand traffic lane boundary crossed" 410 is generated or set as illustrated in the flow chart of FIG. 4. For such a check, it is initially verified, in a first step 420, whether the right-hand EGO line has been crossed. If this is recognized to be the case, status 410 is set. If it is recognized in the first step that the right-hand EGO line has not been crossed, it is verified in a subsequent step 430 whether the left-hand EGO line has jumped. If this is recognized to be the case, status 410 is set again. If it is recognized in step 430 that the left-hand EGO line has not jumped, it is verified in a next step 440 whether the right-hand line of the right-hand adjacent lane has jumped. In the event of a positive result of the check in this step 440, status 410 is set again. In the case of a negative result of the check of whether the right-hand line of the right-hand adjacent lane has jumped, it is verified in a further step 450 whether the left-hand line of the left-hand adjacent lane has jumped. If this is recognized to be the case, status 410 is set again.

According to another aspect of the present invention, a method is proposed which generates a very robust and smooth target line. A target line, which achieves the reduced dynamics without post-filtering and without additional sensors, is generated from independent line segments, for example, with the aid of a statistical analysis. A very robust target line is thus available for future partially automated (=narrow vehicle guidance with intense interventions) or highly automated (=systems having automatic lane change guidance) LKS systems.

In this exemplary embodiment of the present invention, one important aspect of the present invention is to enable statistical analysis of individual line segments, inclusion of dynamically inferior lines, use of the adjacent lane lines, and a combination of them to form a robust target line. The greatest advantages result from the fact that post-filtering of the target line is unnecessary, since the target line already meets the dynamic requirements for a smooth line due to the method described herein. A post-filtering not being needed allows the LKS regulating system to perform a smoother, more robust, and, mainly, more stable regulation of the vehicle. Another advantage is the elimination, implicitly contained in the method, of the effects of line error detections, signal discontinuities for example. These highly dynamic effects are no longer reflected in the target line when using the method described in greater detail below. Thus, providing the target line is more robust compared to providing the target line via other methods and without the use of additional sensors (for example, digital map data).

Conventional commercial LKS systems (which, for example, may include a video camera for line detection, a control unit for regulation, a steering or braking unit as actuators) which support the driver in the transverse guidance of the vehicle via light, limited interventions, do not need very robust target line generation, since the interventions in the driving dynamics are only minor. Also, no strict stability requirements exist for a regulating circuit to be used, which allows a standard filtering (which often presents a problem with respect to a long time delay) of the target line without loss of stability in the regulating circuit.

In the future, however, LKS systems will intervene more intensively in the control of the vehicle, which requires, primarily, a reduction in the errors in providing the target line and thus makes a robust and stable regulation for this vehicle control necessary.

Today's line detectors recognize independent, individual line segments and should not make any parallel line assumptions for a stable and high detection performance. Therefore, the individual lines no longer depend on the implementation or the system.

The example method described herein processes the individual lines or line segments, which will also be referred to as individual lines hereinafter. The individual lines are described as a third-degree polynomial and have the coefficients Y—lateral axis with respect to the vehicle, $\Psi_D$—angle of orientation of the vehicle to the line, structural curvature κ of the line and the change in the curvature.

Figure 5:
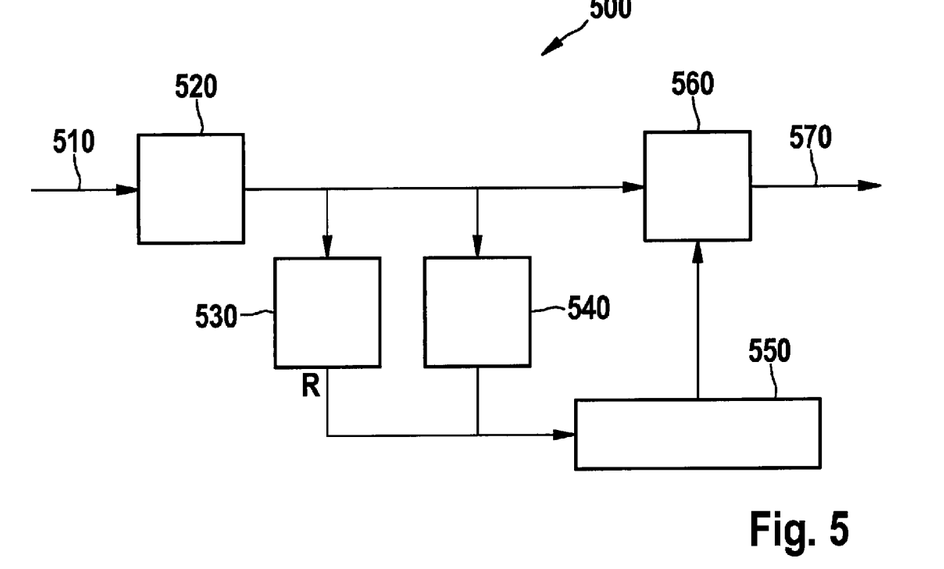
FIG. 5 shows a flow chart of another exemplary embodiment of the present invention as a method.
Figure 6A:
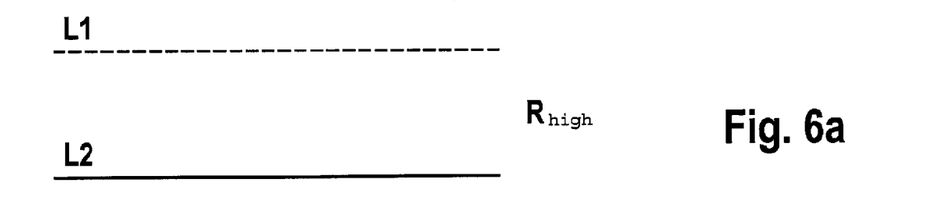
FIGS. 6a and 6b show illustrations for showing the formation of correlation values from different lines.
Figure 6B:
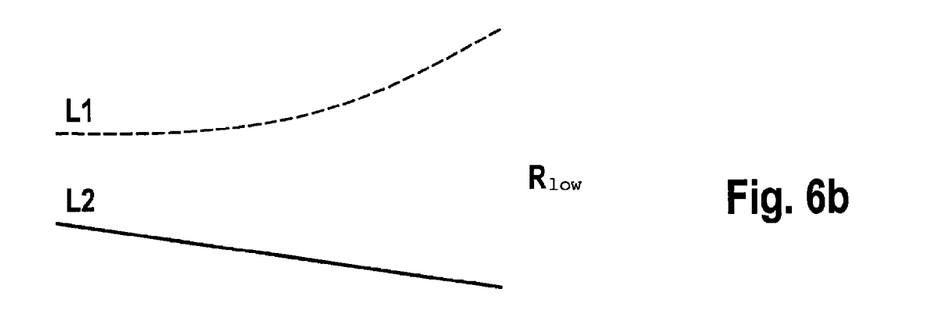

The main object of the example method described below is curvature preparation. Curvature preparation may be performed according to the steps of method 500 according to the flow chart in FIG. 5. In such a method 500, initially lines or line segments 510 are provided as they were obtained, for example, from step 210 in FIG. 2. As the illustration of FIG. 5 shows, the change in the curvature of lines 500 is limited against transient signal variations in the first block or step 520. The limitation is based on a physically motivated value. Using a subsequent statistical analysis in a further step 530, the (line) correlation of the individual lines (or at least two lines) is calculated. Expressed more precisely: A correlation of the (change-limited) curvature values provided by first step 520 is determined. Since the dependence of the individual lines results only from the structural characteristics (for example, shape of the guard railings or of a roadway marking), the calculated correlation coefficient R is high when the lines run approximately in parallel as shown in FIG. 6a as an example. If the lines diverge, a small correlation coefficient R results as shown in FIG. 6b as an example. If this correlation R is calculated over a time interval starting from the instantaneous time over already measured values, a high-quality estimate of the road shape may be performed. In determining the correlation values, the following relationship applies:

Correlation $R_{high}$ means that both lines L1 and L2 are measured independently and display an identical road shape (see FIG. 6a).

Correlation $R_{low}$ means that both lines L1 and L2 are measured independently and display different road shapes (see FIG. 6b).

Furthermore, a mean value of the line slope may be determined in step 540 from the curvatures of the lines. Both lines in question, which describe the host vehicle's lane, are now weighted on the basis of this value R (and possibly also on the basis of the formed mean value of the line slopes) and merged to form the target line. For this purpose, in step 550, the weights for the individual lines or line segments are initially formed on the basis of the correlation coefficient(s) R (and possibly of the mean value formed) according to the approach described below, and these weights formed are linked to the curvatures of the individual lines or line segments in step 560 to provide the curvature of a target line to be determined (as a physical reference line 570) for the lane guidance functionality of the driver assistance system.

One point of the present invention is the formation of the weighting from the correlation of the lines, as performed in step 550 in the above description. If correlation R (i.e., a formed correlation value R) exceeds a defined limit $R_{max}$, both lines receive the same weight (for example, the weights a=0.5 and b=0.5) and are then merged, accordingly.

$$K_{target\ line} = a * K_{left\text{-}hand\ line} + b * K_{right\text{-}hand\ line} \tag{1}$$

where the following applies:
$K_{target\ line}$=curvature of the merged target line
$K_{left\text{-}hand\ line}$=curvature of the left-hand line of the traffic lane
$K_{right\text{-}hand\ line}$=curvature of the right-hand line of the traffic lane If ascertained correlation value R is less than a defined limit $R_{min}$, the smoother line receives a greater weight. For this purpose, the changes in curvature of the individual lines are averaged over n previous measured values.

$$\dot{K}_{averaged} = \frac{1}{n} \sum_{0}^{n} \dot{K}_{t-n} \tag{2}$$

This is calculated for each line. The smoother line is always the minimum of the averaged change in the individual lines calculated using equation (2). In the range of values $R_{min}$ to $R_{max}$, the weight is linearly adapted according to the following formula:

$$W_1 = W_0 + |R| \cdot \frac{(0.5 - W_0)}{R_{max}}, \tag{3}$$

$$W_{M1} = 1 - W_0 \tag{4}$$

where the following applies:
$W_1$=weight of the smooth line
$W_{N1}$=weight of the non-smooth line
$W_0$=weight of the smooth line when the correlation value is equal to zero
R=correlation coefficient and
$R_{max}$=upper limit of correlation coefficient R Weights $W_1$ and $W_{N1}$ are assigned to a and b in equation (1) depending on which line is selected as smooth. The change in weight may also be limited, so that only one change of $W_1$, for example, by 10% may occur in each time step. This may be advantageous because no discontinuities in the weights may occur if the relationships of the smooth lines are reversed.

Another advantage may be provided by taking into account the adjacent lines. The correlation values may also be calculated for these lines, together with, in principle, all other detected lines, for example, a correlation value between the left-hand traffic lane line and the left-hand adjacent traffic lane line. If the correlations (i.e., correlation values R) exceed a threshold value $R_{adjacent}$, the corresponding line is taken into account using a weight c or d in the merger curvature equation. A merger according to the following equation thus results:

$$K_{target\ line} = a * K_{left\text{-}hand\ line} + b * K_{right\text{-}hand\ line} + c * K_{left\text{-}hand\ adjacent\ line} + d * K_{right\text{-}hand\ adjacent\ lines} \quad (5)$$

The weights of all curvature portions should yield the sum one. A lower proportion (which is constant, for example) is advantageously assigned to the weights of the adjacent lines. The correlation only decides about including the adjacent curvatures.

The above-described exemplary embodiments are selected only as examples and may be combined with each other.

What is claimed is:

1. A method for providing a curvature of a desired target line for a lane guidance of a vehicle, comprising:
   receiving, by an optical sensor, at least one of a first piece of traffic lane information, which represents an optically detected first traffic lane boundary one of next to or in front of a left-hand vehicle side, and a second piece of traffic lane information, which represents an optically detected second traffic lane boundary one of next to or in front of a right-hand vehicle side; and
   ascertaining, by an analyzing unit, a curvature of the desired target line for lane guidance of the vehicle from at least one of the first piece of traffic lane information weighted using a first weighting factor, and the second piece of traffic lane information weighted using a second weighting factor;
   wherein, in the step of ascertaining:
      the curvature of the desired target line is based on an addition of a first curvature weighted using the first weighting factor and of a second curvature weighted using the second weighting factor, the first curvature being derivable from the first piece of traffic lane information, and the second curvature being derivable from the second piece of traffic lane information, and
      based on a comparison between (i) a correlation value that represents the first curvature from the first piece of traffic lane information and the second curvature from the second piece of traffic lane information and (ii) a predefined correlation threshold value, one of (a) an identical value is and (b) different values are used for the first weighting factor and the second weighting factor.

2. The method as recited in claim 1, wherein in the step of ascertaining, if the comparison indicates that the correlation value exceeds the predefined correlation threshold value, the an identical value is used for the first weighting factor and the second weighting factor.

3. The method as recited in claim 2, wherein if the correlation value is less than the predefined correlation threshold value, in the step of ascertaining, the different values are used for the first weighting factor and the second weighting factor, one of the first weighting factor and the second weighting factor for which the associated traffic lane information having a smaller averaged curvature derivative value from the curvature derivative values over multiple time intervals preceding a point in time of ascertainment being assigned a greater value.

4. The method as recited in claim 2, wherein if the correlation value is in a predefined correlation threshold value range, in the step of ascertaining, the different values are used for the first weighting factor and the second weighting factor, one of the first weighting factor and the second weighting factor being assigned a value $$W_1 = W_0 + |R| \cdot \frac{(0.5 - W_0)}{R_{max}}$$

for which the associated traffic lane information has a smaller average curvature derivative value from the curvature derivative values over multiple time intervals preceding the point in time of ascertainment, and the other one of the first weighting factor and the second weighting factor is assigned the value $$W_{N1} = 1 - W_1,$$

where R represents the correlation coefficient, $W_0$ a weighting value for a correlation coefficient equal to zero, and $R_{max}$ an upper limit of the correlation coefficient.

5. The method as recited in claim 1, wherein, in the step of ascertaining, the one of the first weighting factor or the second weighting factor associated with the first piece of traffic lane information or the second piece of traffic lane information which has a lower curvature characteristic than the other piece of traffic lane information is assigned a greater value.

6. A method for providing a curvature of a desired target line for a lane guidance of a vehicle, comprising:
   receiving, by an optical sensor, at least one of a first piece of traffic lane information, which represents an optically detected first traffic lane boundary one of next to or in front of a left-hand vehicle side, and a second piece of traffic lane information, which represents an optically detected second traffic lane boundary one of next to or in front of a right-hand vehicle side; and
   ascertaining, by an analyzing unit, a curvature of the desired target line for lane guidance of the vehicle from at least one of the first piece of traffic lane information weighted using a first weighting factor, and the second piece of traffic lane information weighted using a second weighting factor;
   wherein:
      in the step of ascertaining, the curvature of the desired target line is based on an addition of a first curvature weighted using the first weighting factor and of a second curvature weighted using the second weighting factor, the first curvature being derivable from the first piece of traffic lane information, and the second curvature being derivable from the second piece of traffic lane information, and
      in the step of receiving, at least one of a third piece of traffic lane information, which represents an optically detected third traffic lane boundary to a left of the first traffic lane boundary is received and a fourth piece of traffic lane information, which represents an optically detected fourth traffic lane boundary to the right of the second traffic lane boundary is received, and in the step of ascertaining the curvature of the desired target line is ascertained from at least one of the third piece of traffic lane information weighted using a third weighting factor and from the fourth piece of traffic lane information weighted using a fourth weighting factor.

* * * * *